Figure 1:
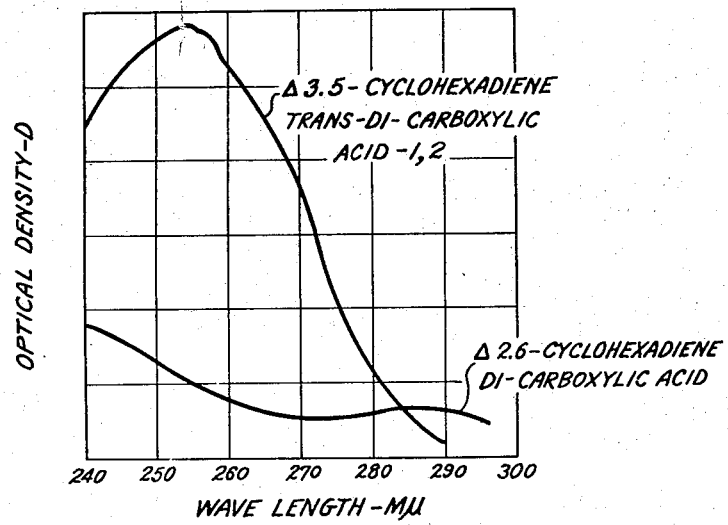

INVENTOR
William E. Elwell
BY
ATTORNEYS

Patented Apr. 4, 1950

2,502,644

UNITED STATES PATENT OFFICE 2,502,644

ALIPHATIC ESTERS OF CYCLOHEXADIENE DICARBOXYLIC ACIDS

William E. Elwell, Berkeley, Calif., assignor to California Research Corporation, San Francisco, Calif., a corporation of Delaware Application February 8, 1946, Serial No. 646,481

9 Claims. (Cl. 260—78.4)

This invention relates to new esters of cyclohexadiene polycarboxylic acids. More particularly, the invention pertains to from liquid to solid aliphatic esters of cyclohexadiene dicarboxylic acids and a saturated aliphatic monohydric alcohol having at least 4 carbon atoms. Desirably the esters of this invention contain at least 16 carbon atoms in the monomeric molecule.

It has been discovered that such higher aliphatic esters of cyclohexadiene dicarboxylic acids are valuable and unique compounds. These esters are liquid to solid in consistency, are relatively stable despite the fact that they contain conjugated diene unsaturation, and yet are not so stable but that they are moderately reactive and can be polymerized by certain methods. Viscosity, volatility, and low temperature characteristics, together with their unique chemical structure (involving as it does the combination of two ester groups on a conjugated diene cycloaliphatic ring) renders the new compounds of this invention particularly adaptable to the preparation and modification of plastic compositions.

In explanation of the new properties possessed by the present compounds, it should be noted that the conjugated diene system of the cycloaliphatic ring is modified in reactivity by the two relatively long-chain ester groups and that as thus modified, the conjugated diene ring may serve either as a region of only moderate unsaturated reactivity or as a region of unreacted residual valence forces. The moderate reactivity of the ester molecule may be utilized, for example, as a means of modifying or plasticizing polymeric synthetic resin compositions by introducing the ester molecule into the polymer molecule either by chemically combining the ester with a reactive group in a preformed polymer or by copolymerization of the monomeric esters with other copolymerizable monomers. On the other hand, the relative stability of the esters of this invention and the residual valence forces therein can be utilized by merely incorporating the ester as an intimate or solvated mixture with synthetic resin compositions. In such intimate mixtures, the residual valence forces may serve to form coordination compounds at points of unsaturation or polarity in the polymer molecules of the synthetic resin. This characteristic is of value in plasticizing synthetic resins, since such coordination forces tend to prevent "bleeding" or "sweating out" as well as to decrease fugacity of the ester. Whether it be for this or other reasons, the compounds of this invention possess a combination of viscosity, volatility, reactivity and compatibility characteristics which are not to be found in other compounds.

The cyclohexadiene dicarboxylic acids from which the esters of this invention may be derived exist in a number of related isomeric forms. The conjugated diene acids are preferred and derivatives of Δ3,5-cyclohexadiene dicarboxylic acid-1,2 are at present regarded as most desirable. The higher aliphatic esters of Δ2,6-cyclohexadiene dicarboxylic acids also are advantageous, and a mixture consisting predominately of higher esters of Δ3,5-cyclohexadiene trans-dicarboxylic acid-1,2, but containing small amounts of the higher esters of Δ2,6-cyclohexadiene dicarboxylic acid are included in this invention.

Although esters of the foregoing acids are preferred, the broader aspects of the invention embrace $C_{16}$ and higher aliphatic esters of cyclohexadiene dicarboxylic acids generally. These acids and their esters have common properties characteristic of the family, but individual members such as the higher esters of the Δ3,5-acid have outstanding distinguishing properties which set them apart from other members of the group.

The system of nomenclature here utilized for identifying these different isomeric acids adopts a standard numbering of the carbon atoms of the cyclohexadiene ring illustrated by the following:

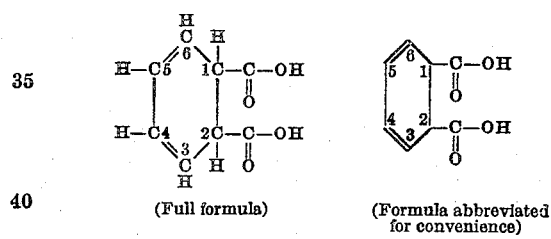

(Full formula)   (Formula abbreviated for convenience)

Thus, the position of the carboxyl groups in the above compound is (1), (2).

In the terminology here used, the sign Δ signifies a double bond, and Δ1 would indicate a double bond between the (1) and (2) carbon atoms of the ring; Δ2 would place the double bond between the (2) and (3) carbon atom, etc. The complete name of the above acid would, therefore, be Δ3,5-cyclohexadiene dicarboxylic acid-1,2. When the stereo-isomer of this acid is the cis form, it is anhydride forming, when the trans type, it does not form the corresponding anhydride but rather the anhydride of the cis acid upon treatment with suitable reagents such as acetic anhydride.

The foregoing and other acids of this series are sometimes termed dihydrophthalic acids, and identifying numbers utilized merely to place the position of the added hydrogen atoms; for example, the foregoing acid could be designated 1,2-dihydrophthalic acid. But this terminology is misleading insofar as it implies equivalency between phthalic acids and the cyclohexadiene dicarboxylic acids. Accordingly, this specification utilizes terminology which is believed to describe more accurately the nature of the compounds and compositions discovered.

The compounds and compositions of this invention in its broader aspects, may be derived from any one or more of the following exemplary cyclohexadiene dicarboxylic acids:

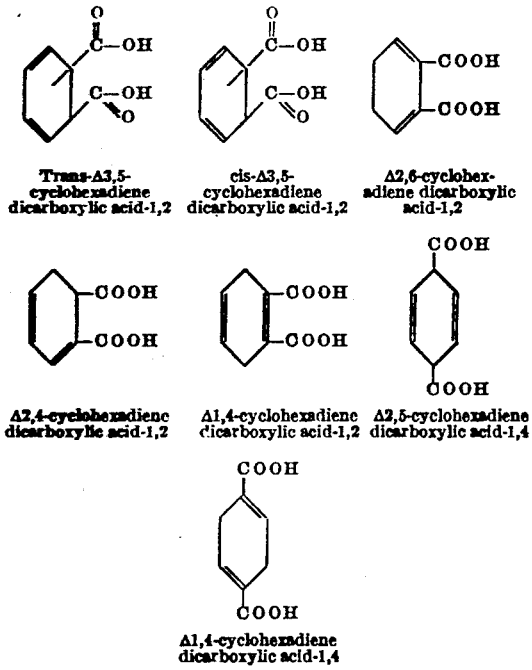

In accordance with the invention, the new esters may be formed by esterification of a suitable cyclohexadiene polycarboxylic acid with an aliphatic alcohol containing at least 4 carbon atoms. The new class of esters is characterized by the type formula:

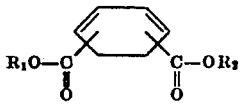

where $R_1$ and $R_2$ are aliphatic radicals, at least one of which contains no less than 4 carbon atoms. The ester should contain from 16 up to 48 or more carbon atoms in a molecule. Desirably, the aliphatic radicals are saturated in character and may be derived from either acyclic or cyclic aliphatic alcohols. Examples of suitable aliphatic alcohols are butyl, amyl, hexyl, heptyl, octyl, decyl, dodecyl, tetradecyl, hexadecyl, and octadecyl alcohols. Cyclohexyl and methyl cyclohexyl alcohols, as well as other saturated cycloaliphatic alcohols may be used to form aliphatic esters according to this invention. Although the alcohol radical of these new esters may be closed, straight, or branch chain and may contain up to 20 or more carbon atoms, esters in which the alcohol radicals have from 4 to about 12 carbon atoms are preferred. For some purposes, esters of water insoluble alcohols ($C_5$ and higher) are best. As previously indicated, such esters of $\Delta 3,5$-cyclohexadiene dicarboxylic acid-1,2 are presently regarded as most desirable.

The preparation of esters of $\Delta 3,5$-cyclohexadiene dicarboxylic acid-1,2 is complicated by the fact that the $\Delta 3,5$-acid tends to rearrange or isomerize to $\Delta 2,6$-acid according to the equation:

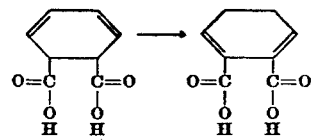

The variation in the rate of this isomerization reaction with temperature is illustrated by the data in Table 1, which gives the half life of $\Delta 3,5$-cyclohexadiene trans-dicarboxylic acid-1,2 dissolved in dilute sulfuric acid.

TABLE 1

Half life of $\Delta 3,5$-cyclohexadiene trans-dicarboxylic acid-1,2[1] in 5% aqueous $H_2SO_4$

| Temperature, °F. | Half life, hrs. |
|---|---|
| 185 | 7.0 |
| 203 | 5.3 |
| 213 | 2.75 |

[1] 4.5% concentration.

These isomerization rates approximate very closely the isomerization reaction rate in water at corresponding temperatures. Isomerization of the $\Delta 3,5$-acid in aqueous alkali solution is so rapid that rate measurements have not been found feasible. The reverse reaction, i. e., $\Delta 2,6$-acid→$\Delta 3,5$-acid does not occur to a substantial extent, so far as known.

A method for distinguishing the structures of the $\Delta 3,5$ and the $\Delta 2,6$-acids and esters thereof, involves measurement of the ultra violet light absorption spectrum of the products. The spectra of the two acids is sufficiently distinct to make such a comparison a ready and convenient one, and esters of the given acids have an absorption spectrum like that of the parent acid. $\Delta 3,5$-cyclohexadiene trans-dicarboxylic acid-1,2 possesses a strong characteristic maximum absorption at 254 m$\mu$ and specific extinction coefficient at this wave length of about 25.8. The absorption curve for $\Delta 2,6$-cyclohexadiene dicarboxylic acid-1,2 displays no such maximum but shows a weaker maximum absorption at about 285 m$\mu$.

The ultra-violet light absorption characteristics of the compounds herein disclosed may be referred to in various conventional units which are defined mathematically as follows:

$$\text{Optical density} = D = \log_e \frac{I_0}{I}$$

where $I_0$=intensity of the incident light ray falling on the solution under test, and
$I$=the intensity of the transmitted ray.

$$\text{Specific extinction coefficient} = \frac{D}{C}$$

where c = concentration of the compound in grams per 1000 cc.

$$\text{Molar extinction coefficient} = \frac{D}{C}$$

where C = concentration of the compound in moles per liter =

$$\frac{C}{\text{Mol. wt.}}$$

It will be seen from the foregoing that, mathematically, molar extinction coefficient is the multiplication product of the specific extinction coefficient and the molecular weight of the compound.

Figure 2:
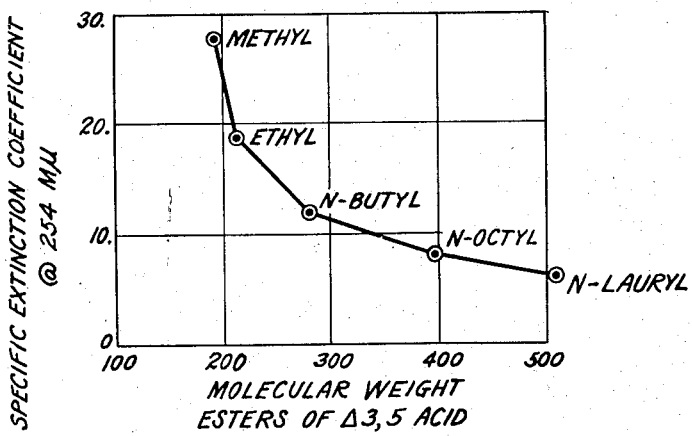
Figure 3:
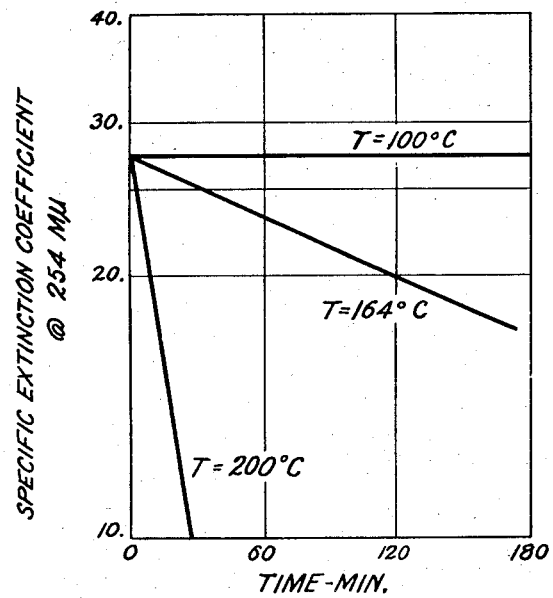
Figure 4:
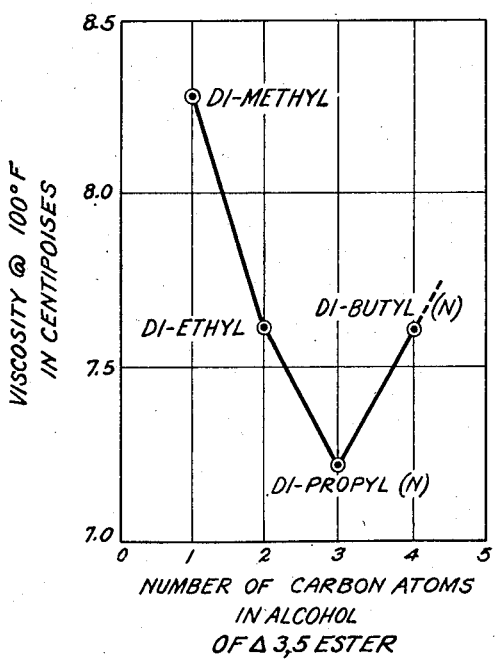

Figure 1 of the drawing exemplifies the characteristic ultra-violet absorption curves for the Δ3,5 and Δ2,6-cyclohexadiene dicarboxylic acid. Figure 2 is a graph showing the effect on specific extinction at 254 mμ, of molecular weight of the alcohol radical in the Δ3,5-esters. Figure 3 presents the effect of temperature on an organic solution of Δ3,5-cyclohexadiene dicarboxylic acid. Figure 4 is a graph illustrating viscosity characteristics of certain esters.

In the preparation of the esters of Δ3,5-cyclohexadiene transdicarboxylic acid-1,2 it has been found advantageous to utilize nonaqueous organic solvents, and the stability of this acid in such solvents is an important factor in the preparation of the esters. The effect of temperature on organic solutions of the Δ3,5-acid has been investigated and data on this feature are given in Figure 3 of the drawings and Table 2 herein below:

TABLE 2

*Stability of Δ3,5-cyclohexadiene trans-dicarboxylic acid-1,2 in organic (nonaqueous solvent)[1]*

| Temperature, °C. | Half life, Min. |
| --- | --- |
| 100 | No change |
| 164 | 260.0 |
| 200 | 12.5 |

[1] Dioxane with or without carboxylic acids such as stearic and oleic

In general, Δ3,5-cyclohexadiene trans-dicaboxylic acid-1,2 decomposes in organic solvents at 200° C. but is stable at 100° C. As will be observed from Table 2, the half life of this acid is about 260 minutes at 164° C. Thus it has been discovered that time and temperature of the esterification reaction can be so correlated and controlled as to yield either substantially pure monomeric esters of Δ3,5-cyclohexadiene dicarboxylic acid, or when desired, mixtures of monomeric esters of the Δ3,5 and Δ2,6-acids.

The precise limits of time and temperature correlation necessary to produce practically pure monomeric esters of the Δ3,5-acid cannot be exactly defined because of the complex correlation between these variables as well as the effect of concentration of reactants in the solution. However, exposure to temperatures above 100° C. must be of short duration and the higher the temperature, the shorter the period of exposure permissible. At temperatures above 180° C. the Δ3,5-acid and esters thereof are rather quickly converted to other compounds whereas substantially no conversion or decomposition occurs at 100° C. or less.

A preferred method of synthesis of the compounds of this invention comprises dissolving Δ3,5-cyclohexadiene trans-dicarboxylic acid-1,2 in a volatile organic solvent having a boiling point at the desired reaction temperature, adding the alcohol and an esterification catalyst such as sulfuric acid, benzene sulfonic acid, or p-toluenesulfonic acid monohydrate. This mixture is then slowly refluxed in a system which separates water distilled overhead in or with the solvent before returning the distilled solvent to the reaction flask. Glass apparatus is suitable.

The ester may be purified by first filtering the reaction mixture (if any solid is present), washing with water, followed by washes with a 5% aqueous solution of sodium bicarbonate until the aqueous layer is alkaline to litmus, to insure removal of acidic material. The nonaqueous ester layer may be washed with water again to remove residual sodium bicarbonate and until no longer alkaline to litmus. It is frequently desirable to chill the ester solution by adding finely crushed ice before or during the first water wash in order to facilitate separation of the ester layer. The addition of ether and/or sodium chloride also has been found advantageous in the breaking of emulsion and separation of the ester layer from the water layer during the washing procedure.

The washed solution of the ester may be stored over a dehydrating agent such as anhydrous sodium sulfate and potassium carbonate and refrigerated under an inert atmosphere to avoid any possible change in character. Subsequently, recovery of a pure ester product may be effected by filtration of the ester solution and removal of solvent by mild heating under vacuum, as for example, by utilizing a water bath and a vacuum of 4 to 8 millimeters of mercury pressure until the low-boiling solvent ceases to distil. A stream of carbon dioxide or other inert gas may be passed through the solution during this operation.

As previously indicated, the esters of this invention possess a unique combination of properties. In this connection, an important discovery embraced by the invention is illustrated in the graph of Figure 4 in the drawings. Viscosity of esters of Δ3,5-cyclohexadiene trans-dicarboxylic acid-1,2 is plotted against the number of carbon atoms in the alcohol radicals in Figure 4 and reveals the surprising fact that the viscosity of these esters decreases from methyl through ethyl to the propyl ester. The curve then suddenly breaks and reverses with an increased viscosity in the butyl and other higher esters. Thus the higher esters beginning with butyl posses a combination of viscosity and volatility characteristics which could not be predicted from those of the methyl, ethyl, and propyl esters.

Additionally, it has been discovered that esters of the Δ3,5-acid and $C_4$ to about $C_{12}$ alcohols have valuable low temperature characteristics in that they do not crystallize but gradually change from the liquid to the semi-solid state in freezing point tests. As temperature is lowered these esters merely become highly viscous to plastic solid in consistency.

The following specific examples will serve to illustrate the derivation and preparation of the esters of this invention and to guide those skilled in the art in obtaining the same.

*Example 1.—Di-n-butyl ester of Δ3,5-cyclohexadiene trans-dicarboxylic acid-1,2*

This ester was prepared in glass by using 16.8 grams (0.1 mol) of Δ3,5-cyclohexadiene trans-dicarboxylic acid-1,2; 29.65 grams of normal butyl alcohol (0.40 mol); 100 cc. of toluene as a solvent; and .0808 gram (0.005 mol) of benzene sulfonic acid as an esterification catalyst. The cyclohexadiene dicarboxylic acid, normal butyl alcohol, benzene sulfonic acid, and toluene were mixed and heated in a carbon dioxide atmosphere under refluxing conditions. A trap was provided in the refluxing system to remove water distilled over with the toluene solvent. After reacting the mixture for 2 hours and 3 minutes at the boiling point, the reaction mixture was cooled and stored over night in a stoppered flask. The following day refluxing was continued for 1 hour and 57 minutes, making a total reaction time of 4 hours. The mixture was then allowed to cool, ether added, and the ester solution washed with water. After separation of the solution from the water wash, it was then washed with 5% sodium bicarbonate solution until no longer acid to litmus (two washes). This solution was finally washed with water to remove any sodium bicarbonate solution and dried over sodium sulfate, potassium carbonate, and filtered. The resulting clear yellow filtrate was stored in glass under carbon dioxide in a refrigerator at a temperature of from about −10 to −20° F. This product was a solution in ether of the dibutyl ester of Δ3,5-cyclohexadiene trans-dicarboxylic acid-1,2. The ester was recovered from the solvent by gently warming on a water bath under vacuum to obtain 25.6 grams of a clear yellow oil (yield 91.4% of theoretical). The ester product was next decolorized by dissolving in ethyl alcohol, shaking with a decolorizing carbon ("Norite") for about 1½ hours and filtered. After two more "Norite" treatments and final removal of the ethyl alcohol, a pale yellow odorless oil having the following analyses was obtained:

| Test | Found | Calculate |
|---|---|---|
| Per cent Carbon | 68.11 | 68.53 |
| Per cent Hydrogen | 8.78 | 8.63 |
| Saponification equivalent | 146 | 140 |
| Iodine number | 89.6 | 90.5 |
| Density (60° F.) | 1.0276 | |
| Refractive Index (2.° C.) | 1.4720 | |
| Molecular refraction | 76.41 | 76.51 |

Ultra-violet light absorption spectrum revealed that the ester had a characteristic maximum at 254 mμ with a specific extinction co-efficient of 11.68. This ester remains liquid at low temperatures and does not solidify or crystallize even when stored for long periods of time at −10° F. When cooled in a freezing point apparatus to temperatures as low as −79° F., crystallization does not normally occur and viscosity increases to produce a semi-fluid amorphous plastic mass. These low temperature properties are valuable and of advantage in applications where crystallinity may be undersirable, as in plasticizers for organic resin compositions.

*Example 2.—Di-n-butyl ester of Δ3,5-cyclohexadiene trans-dicarboxylic acid-1,2*

In this preparation, carbon tetrachloride was used as the solvent and p-toluenesulfonic acid monohydrate as the catalyst. Reagents and quantities thereof were as follows:

336 grams (2 mols) ___ Δ3,5-cyclohexadiene trans-dicarboxylic acid-1,2
1464 cc. (18 mols) ___ Normal butyl alcohol
9.5 grams ___ p-Toluenesulfonic acid monohydrate
500 cc. ___ Carbon tetrachloride The mixture of reagents was refluxed in glass for a total time of about 15 hours and water of reaction was trapped out of the system as in the previous preparation. Upon completion of the refluxing operation, the reaction mixture was quickly chilled by the addition of crushed ice and immersion of the container in an ice bath. The resulting solution of the dibutyl ester of the Δ3,5-acid was purified by washing once with water, three times with 5% sodium bicarbonate (emulsion broken with ether and sodium chloride) and the purified carbon tetrachloride solution stored over anhydrous sodium sulfate and potassium carbonate under carbon dioxide and at −10 to −20° F. After filtration, the ester was recovered by evaporation of solvent on a steam bath under moderate vacuum for 2½ hours followed by heating at 18 mm. pressure for a 1½ hours. This ester, in 86.0% yield, was dark red in color. Decolorization by clay treatment of a carbon tetrachloride solution of the ester and subsequent filtration followed by removal of the solvent under vacuum at a temperature of 70–80° C. produced a pale yellow oil in 60.7% yield on which the following analyses were obtained:

| Test | Found | Calculated |
|---|---|---|
| Index of Refraction (20° C.) | 1.4731 | |
| Density (60° F.) | 1.0276 | |
| Iodine number | 79.6 | 90.5 |
| Saponification equivalent | 140.5 | 140.0 |

These analyses serve to identify the final product as an ester of cyclohexadiene dicarboxylic acid similar to that of Example 1.

*Example 3.—Dioctyl ester from Δ3,5-cyclohexadiene trans-dicarboxylic acid-1,2*

The general procedure of Example 1 was followed in the preparation of this ester, but sulfuric acid was adopted as the esterification catalyst. A mixture of 8.4 grams (.05 mol) of Δ3,5-cyclohexadiene trans-dicarboxylic acid-1,2; 26.0 grams (.02 mol) of normal octyl alcohol; 50 cc. of toluene as solvent; and 0.24 cc. (0.0043 mol) of concentrated sulfuric acid, was heated at refluxing temperature for 2 hours and 17 minutes in a nitrogen atmosphere. Water of reaction was trapped out as in Example 1.

At the end of the reflux period the reaction mixture was allowed to cool and the crude yellow solution of the dioctyl ester of Δ3,5-cyclohexadiene trans-dicarboxylic acid-1,2 stored in glass under nitrogen.

Purification and recovery of the ester was later effected by washing the yellow toluene solution with enough 5% aqueous sodium bicarbonate to render the toluene layer non-acid to litmus. Some emulsification in the wash water occurred and the aqueous layer was therefore shaken with a small amount of ether and the ether extract combined with the main toluene solution. The combined ether-toluene solution was washed with water until neutral to litmus and dried over anhydrous sodium sulfate and potassium carbonate. The dried solution was filtered and the solvents removed by heating under vacuum. The residue was the dioctyl ester of a cyclohexadiene dicarboxylic acid-1,2.

*Example 4.—Dioctyl ester of Δ3,5-cyclohexadiene trans-dicarboxylic acid-1,2*

In this preparation, a glass refluxing apparatus provided with a water trap was utilized as in Example 3 above. A mixture of 6.72 grams (0.04 mol) of Δ3,5-cyclohexadiene trans-dicarboxylic acid-1,2; 20.8 grams (0.16 mol) of normal octyl alcohol; 50 cc. of toluene, and 0.19 cc. of concentrated sulfuric acid (0.0034 mol) was refluxed in a carbon dioxide atmosphere. Most of the water of esterification collected in about ½ hour, but the mixture was refluxed for 2¼ hours. Purification procedure was as follows:

After cooling, the reaction mixture was shaken with ethyl ether and 5% aqueous sodium bicarbonate until the aqueous layer was slightly alkaline to litmus. The aqueous layer was extracted with ethyl ether to remove any entrained ester. This ether solution was combined with the main ester solution and the combined solutions again washed with water until the wash water was neutral to litmus. The resulting product was a solution of the dioctyl ester of Δ3,5-cyclohexadiene trans-dicarboxylic acid-1,2 and was dried over anhydrous sodium sulfate and potassium carbonate under a carbon dioxide atmosphere.

Purified ester was recovered from the solvent by vacuum distillation (165–170° F. at 6 mm. of mercury) to obtain a golden brown oil in 88.4% yield. Ultra-violet light absorption spectrum for this product showed a characteristic maximum absorption at 254 mμ with a specific extinction coefficient of 7.942 and identifies the compound as the ester of a Δ3,5-acid. Analyses were obtained on this ester as follows:

| Test | Found | Calculated |
|---|---|---|
| Percent Carbon | 73.07 | 73.43 |
| Percent Hydrogen | 9.57 | 10.27 |
| Saponification equivalent | [1] 197 | 196 |
| Iodine Number | 55.4 | 64.6 |
| Refractive index (20° C.) | 1.4695 | |
| Density (60° F.) | 0.9632 | |
| Molecular refraction | 113.61 | 113.32 |

[1] Average.

*Example 5.—Dilauryl ester of Δ3,5-cyclohexadiene trans-dicarboxylic acid-1,2*

This ester was made from 42 cc. (0.0187 mol) of n-dodecyl alcohol (lauryl alcohol) and 13.45 grams (0.08 mol) of Δ3,5-cyclohexadiene trans-dicarboxylic acid dissolved in 100 cc. of toluene solvent with 0.0618 gram (0.0039 mol) of benzenesulfonic acid catalyst. The mixture was refluxed at its boiling point. The total reaction time was 4 hours and 23 minutes.

Following the esterification reaction, ether was added to the reaction mixture and the solution washed once with water, twice with 5% sodium bicarbonate, and finally, three times with water. The washed solution was dried over anhydrous sodium sulfate and potassium carbonate, filtered and the solvents and any lauryl alcohol present were removed by heating under vacuum while drawing a restricted stream of carbon dioxide through the solution. A golden brown oil remained. The heating schedule was as follows:

|  | Minutes |
|---|---|
| Steam bath (moderate vac.) | 10 |
| 89.4° C. (4 mm. of Hg pressure) | 7 |
| 100–104.4° C. (4 mm. of Hg pressure) | 5 |
| 88.3–93.3° C. (4 mm. of Hg pressure) | 5 |

This product was the dilauryl ester of Δ3,5-cyclohexadiene trans-dicarboxylic acid-1,2 as shown by the fact that the ultra-violet light absorption spectrum exhibited a maximum absorption at 254 mμ with a specific extinction of 5.544. Analyses were as follows:

| Test | Found | Calculated |
|---|---|---|
| Percent Carbon | 76.34 | 76.17 |
| Percent Hydrogen | 11.82 | 11.18 |
| Saponification equivalent | 270 | 252 |
| Iodine number | 38.8 | 50.3 |
| Index of refraction (20° C.) | 1.4679 | |
| Molecular refraction | 151.35 | 150.16 |
| Specific gravity (60° F.) | 0.9271 | |

*Example 6.—Dilauryl ester of Δ2,6-cyclohexadiene dicarboxylic acid-1,2 from Δ3,5-ester*

The ester of Example 5 was isomerized to the dilauryl ester of Δ2,6-cyclohexadiene dicarboxylic acid-1,2 by heating in a carbon dioxide atmosphere as follows:

|  | Min. |
|---|---|
| 128.9–133.3° C. (4 mm. mercury pressure) | 10 |
| 143–145° C. (4 mm. mercury pressure) | 13 |

Practically no loss in weight occurred during isomerization and a product was obtained with an ultra-violet light absorption spectrum characteristic of the Δ2,6-cyclohexadiene dicarboxylic acid and its esters. The data establishes the fact that the Δ3,5-ester was converted to the Δ2,6-ester by heat.

The isomerized product was an oil obtained in practically 100% yield on which the following analyses were obtained:

| Test | Found | Calculated |
|---|---|---|
| Per cent Carbon | 75.95 | 76.17 |
| Per cent Hydrogen | 11.19 | 11.18 |
| Saponification equivalent | 252 | 252 |
| Refractive index (20° C.) | 1.4694 | |
| Specific gravity (60° F.) | 0.9291 | |
| Molecular refraction | 151.42 | [1] 151.19 |

[1] Calculated for exaltation (assuming exaltation=0.519 per

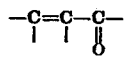

This exaltation calculated from ethyl crotonate data in Beilstein II (188)).

*Example 7.—Dicyclohexyl ester of Δ3,5-cyclohexadiene trans-dicarboxylic acid-1,2*

The preparation of this ester was carried out with careful temperature control. The reagents and quantities thereof were as follows:

33.6 grams (0.2 mol) — Δ3,5-cyclohexadiene-trans-dicarboxylic acid-1,2
41.6 cc. (0.4 mol) — Cyclohexanol
0.9 gram (0.01 mol) — p-Toluenesulfonic acid
75 cc. — Toluene The mixture of reagents was refluxed for a total of 4 hours and water of reaction distilled overhead with the toluene. Upon the completion of the reaction, the mixture was cooled and the solution purified by water and aqueous sodium bicarbonate washes as in previous procedures. The dicyclohexyl ester of the Δ3,5-acid was recovered by distilling off the solvent with gentle heating (maximum temperature 85° C.) under vacuum down to 5 mm. of mercury pressure. The ester remaining after this distillation was a golden brown viscous liquid obtained in 73.4% yield. When decolorized with "Norite" the ester was a yellow viscous clear liquid having only a very faint odor of cyclohexanol. The following anaylses were obtained upon the foregoing ester before and after decolorizing:

| Test | Before Decolorizing | After Decolorizing |
|---|---|---|
| Per cent Carbon | 71.91; 70.88 | 71.59; 71.19 |
| Per cent Hydrogen | 7.85; 7.85 | 8.32; 8.49; 8.15 |
| Saponification equivalent | 162; 163 | 144; (142; 146) |
| Iodine number | 76.0 | 64.5 |
| Index of refraction (20° C.) | 1.5060 | 1.5060 |
| Density | | 1.0952 |
| Specific extinction (254 mµ) | | 11.62 |

These data show that the ester is not isomerized substantially by the decolorizing treatment.

*Example 8.—Mixture of dicyclohexyl esters of Δ3,5-cyclohexadiene trans-dicarboxylic acid-1,2 and Δ2,6-cyclohexadiene dicarboxylic acid-1,2*

The mixed ester was prepared by refluxing the following reagents in glass:

33.6 grams (0.2 mol) __ Δ3,5-cyclohexadiene trans-dicarboxylic acid-1,2
166.6 cc. (1.6 mols) ___ Cyclohexanol
1.58 grams (0.01 mol) _ Benzenesulfonic acid
150 cc. _____ Toluene The reaction was carried out for a total of 8 hours and 34 minutes and refluxing effected by heating in a water bath which reached a final temperature of 150° C. The resulting ester was recovered (after washes with water, aqueous sodium bicarbonate, and a drying treatment over sodium sulfate and potassium carbonate) from the solvent by distillation under vacuum. The resulting product was a golden brown viscous oil obtained in 74.9% yield. The ester consisted of an isomerized mixture of the dicyclohexyl esters of the Δ3,5- and Δ2,6-acid. Analyses were as follows:

| Test | Found | Calculated |
|---|---|---|
| Per cent Carbon | 71.07 | 71.83 |
| Per cent Hydrogen | 8.48 | 9.04 |
| Saponification equivalent | 163 | 167 |
| Iodine number | 68.5 | 75.9 |
| Specific gravity (60° F.) | 1.1035 | |
| Index of refraction (20° C.) | 1.5083 | |
| Molecular refraction | 89.84 | 90.72 |
| Molecular weight | 325, 340 | 332 |

*Example 9.—Dilauryl ester of Δ2,6-acid from Δ3,5-cyclohexadiene trans-dicarboxylic acid-1,2*

The reagents and quantities thereof used in this preparation are as follows:

16.8 grams (0.1 mol) __ Δ3,5-cyclohexadiene trans-dicarboxylic acid-1,2
60 cc. (0.268 mol) ____ Lauryl alcohol
0.808 gram (0.005 mol) .Benzenesulfonic acid
100 cc. _____ Toluene The reaction mixture was refluxed for a total period of 4 hours, cooled, and purified by washing, drying, and filtering as in previous examples, to obtain a clear light yellow solution of the dilauryl ester of Δ3,5-cyclohexadiene trans-dicarboxylic acid-1,2. This ester was isomerized to the dilauryl ester of Δ2,6-cyclohexadiene dicarboxylic acid-1,2 apparently by reason of exposure to isomerization temperatures for a substantial period of time during its separation from solvent by distillation. The isomerized product with solvent removed was a viscous light yellow oil which became a cream colored wax-like solid on standing in a refrigerator (at about −10 to −20° F.) over night. This waxy solid readily melted on warming to room temperature. Analyses on the product were as follows:

| Test | Found | Calculated |
|---|---|---|
| Percent Carbon | 76.34 | 76.17 |
| Percent Hydrogen | 10.46 | 11.18 |
| Iodine number | 16.6 | 50.3 |
| Saponification equivalent | 270 | 252.4 |
| Specific gravity (60° F.) | 0.9450 | |
| Index of refraction (20° C.) | 1.4780 | |
| Molecular refraction | 151.0 | [1] 151.19 |

[1] Calculated for dilauryl Δ2,6-cyclohexadiene dicarboxylate-1,2 with exaltation.

Ultra-violet light absorption characteristics of the ester as finally separated showed that it consisted essentially of the dilauryl ester of the Δ2,6-acid since the specific extinction showed no maximum at 254 mµ but a maximum in the absorption curve was obtained at 280 mµ. The relatively low iodine number revealed by the analyses illustrates the lower reactivity of the Δ2,6-diene ring, and the tendency to form a wax-like solid on cooling is also a distinguishing characteristic of this ester.

*Example 10.—Mixed dicyclohexyl esters derived from Δ3,5-cyclohexadiene trans-dicarboxylic acid-1,2*

An ester of the Δ2,6-cyclohexadiene dicarboxylic acid-1,2 was obtained with the following reagents and procedure:

33.6 grams (0.2 mol) _ Δ3,5-cyclohexadiene trans-dicarboxylic acid-1,2
166.6 cc. (1.6 mols) __ Cyclohexanol
1.58 grams (0.01 mol) _ Benzenesulfonic acid
150 cc _____ Toluene The mixture of reagents was placed in a glass reaction flask, immersed in an oil bath at 110° C., and refluxed for a total time of 8 hours during which the maximum bath temperature was 147° C. The resulting solution of reaction product was purified by washing with water and aqueous sodium bicarbonate, drying over anhydrous potassium carbonate and sodium sulfate and filtering. It was stored under carbon dioxide in a refrigerator. The ester was recovered from the solution as a very viscous sticky dark golden brown oil by distillation of the solvent under vacuum and up to a temperature of 152° C.—yield of ester was 85.7% of theoretical. After decolorizing the ester in carbon tetrachloride solution, and removal of the solvent, the following analyses were obtained:

| Test | Found | Calculated |
|---|---|---|
| Saponification equivalent | 162, 170 | 166 |
| Iodine number | 70 | 75.9 |
| Density | 1.1021 | |
| Index of refraction | 1.5116 | |
| Molecular refraction | 90.45 | 90.72 |

The ultra-violet light absorption spectrum of this ester reveals that isomerization occurred during preparation and that the product was, at least primarily, the dicyclohexyl ester of Δ2,6-cyclohexadiene dicarboxylic acid-1,2.

*Examples 11 and 12*

A dicetyl ester is prepared from Δ3,5-cyclohexadiene transdicarboxylic acid-1,2 by esterification of cetyl alcohol with the corresponding free acid according to the procedures given in previous examples. Likewise, the oleyl ester is prepared by similar esterification procedures.

For purposes of convenience and ready reference, Table 3 summarizes properties of various typical esters of this invention:

nection is avoidance of excessively high temperatures. This may be done in a number of ways.

TABLE 3

| Example No. | Ester of | | Index of Refraction | Molecular Refraction | Specific Extinction | Iodine No. | Description |
|---|---|---|---|---|---|---|---|
| | Alcohol | Acid [1] | | | | | |
| 1 | n-butyl | Δ3,5 | 1.4720 | 76.41 | 11.7@254 | 89.6 | Pale yellow oil. |
| 2 | do | Δ3,5 | 1.4731 | | | 79.6 | Do. |
| 3 | n-octyl | isomerized | | | | | Yellow oil. |
| 4 | do | Δ3,5 | 1.4695 | 113.61 | 7.95@254 | 55.4 | Golden brown oil. |
| 5 | n-dodecyl | Δ3,5 | 1.4679 | 151.35 | 5.54@254 | 38.8 | Do. |
| 6 | do | Δ2,6 | 1.4694 | 151.42 | | | Do. |
| 7 | cyclohexyl | Δ3,5 | 1.5060 | 90.72 | 11.62@254 | 64.5 | Yellow viscous liquid. |
| 8 | dicyclohexyl | Δ3,5 and Δ2,6 | 1.5083 | 89.84 | | 68.5 | Golden brown viscous oil. |
| 9 | n-dodecyl | Δ2,6 | 1.4780 | 151.0 | | 16.6 | Viscous yellow oil. |
| 10 | cyclohexyl | isomerized | 1.5116 | 90.45 | | 70 | Viscous sticky oil. |

[1] All are cyclohexadiene dicarboxylic acids-1,2.

Iodine numbers were determined by Wijs method, using a contact time of 2 hours. The consistently low values obtained for iodine numbers conform to the findings that iodine numbers do not of necessity quantitatively measure the degree of unsaturation. (Tout, Bul. Soc. Chem. 9, 899 (1942).) Accordingly, the iodine numbers indicate the assumed unsaturated structure of the compound, and the less active unsaturation of the Δ2,6-esters is revealed by the lower iodine numbers for these isomeric compounds. Molecular refractions were calculated for no exaltation since it has been observed that cyclohexadiene shows no exaltation. (Zelinsky and Gorgsky, Bev. 41, 2482 (1908).)

In some instances it may be desired to prepare the esters of this invention by reaction of the alcoholate with the cyclohexadiene (diacyl chloride), or by an ester interchange reaction starting, for example, with the dimethyl ester of Δ3,5-cyclohexadiene trans-dicarboxylic acid-1,2 and the desired higher aliphatic alcohol. These processes may be utilized by adopting known procedures.

Mixed esters having two different radicals, one of which contains at least 4 aliphatic carbon atoms are prepared either by partial ester interchange (for example, replacing one methyl group of a dimethyl ester with a butyl or higher radical) or by reaction of an acid ester of one alcohol with a different alcohol, thus:

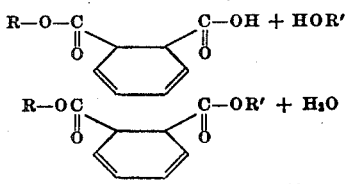

where R' is a $C_4$ or higher aliphatic radical and R is a radical of hydrocarbon structure. Examples of such compounds are the butyl ester, the amyl ester, the octyl ester, the dodecyl ester or the cetyl ester of monomethyl, monoethyl, monopropyl, monohexyl, monocyclohexyl, monododecyl, monooleyl, or monooctadecenyl esters of a Δ3,5 or a Δ2,6-cyclohexadiene dicarboxylic acid-1,2. A long chain alkyl radical (for instance, a saturated or unsaturated $C_{10}$ to $C_{20}$ aliphatic chain) is of advantage in those mixed esters where enhanced oil solubility or dispersibility is desired.

The foregoing detailed disclosures are illustrative of methods for preparing the new esters here disclosed. In general, one should adopt esterification processes and conditions which prevent polymerization where the monomeric ester is desired and an important factor in this con- The use of a solvent for the reaction mixture which boils at a temperature below that at which isomerization or polymerization occurs has the advantage of preventing local overheating in the reaction mixture. Additionally, removal of water or other reaction product and promotion of esterification are advantageously effected either by carrying out the reaction under vacuum or by the selection of a solvent medium which carries water overhead by boiling at low reaction temperatures, or both. To induce more complete esterification in the reaction mixture without causing isomerization or polymerization, relatively high vacuum and corresponding lower temperatures of reaction will be found helpful. Likewise a polymerization inhibitor may be utilized to reduce or prevent polymerization during esterification. Typical inhibitors of addition-type polymerization are hydroquinone and tertiary butyl catechol.

Although the specific illustrations here given utilize the free acid in the esterification reaction, it is to be understood that other ester-forming derivatives of the cyclohexadiene dicarboxylic acids may be substiutted therefor. Where the acid is of the anhydride-forming type it is frequently advantageous to substitute the anhydride for the free acid. Also it is possible to use other ester-forming derivatives such as the acid chloride, the amide, or the imide with liberation of the more volatile HCl or $NH_3$ from an anhydrous reaction medium during esterification. Other suitable variations of the methods herein described will be apparent to those skilled in the art.

Among the valuable chemical properties of the new esters of this invention, the combination of moderate diene reactivity with relatively high stability of the monomeric esters appears to be outstanding. The diene system of the cyclohexadiene ring is more stable in the new esters than might be predicted even though the pair of double bonds be conjugated with each other or with the double bonded oxygen of the carbonyl group. Despite this relatively high stability and conversely, relatively low reactivity, the compounds are polymerizable and convertible to resinous compositions. But even in the resin-forming tendency these new esters appear to be unusual in their behavior.

For example, the aliphatic esters of the Δ3,5-acid do not polymerize in response to peroxide catalysis to any substantial extent at 105° C. and are relatively stable against thermal polymerization at 200° C. Likewise, no polymerization occurred in the presence of gaseous oxygen at 100° C. for 18 hours. On the other hand, when exposed to the atmosphere in thin films the esters appear to increase in molecular weight as evidenced by an increase in viscosity, tackiness or the like. This property is valuable in synthetic resin compositions where the esters are used as a plasticizer since the surface reaction appears to act as a seal thereby furnishing a self-sealing mechanism for preventing "bleeding" or "sweating out" of the ester. Other important properties have been discussed hereinbefore.

From the foregoing anomalous behavior of the esters under certain polymerization conditions it should not be concluded that they cannot be polymerized under other conditions. On the contrary, the aliphatic esters of either the Δ3,5 or the Δ2,6-acids can be polymerized with AlCl₃ or other acid-reacting catalysts to yield products varying from oils of increased viscosity through solids of grease-like consistency. The following data are exemplary:

TABLE 4

| Alkyl ester of | Polymerization Conditions | | | Polymer |
| --- | --- | --- | --- | --- |
| | Catalyst | Time | Temperature | |
| | | | °C. | |
| Δ2,6-cyclohexadiene dicarboxylic acid-1,2 | 4.25% AlCl₃ | 2¾ hrs | 200±5 | Clear golden brown grease. |
| Δ3,5-cyclohexadiene transdicarboxylic acid-1,2 | 4.0% AlCl₃ | 1½ hrs | 173.5–200 | Slight viscosity increase. |
| Do | 4.15% AlCl₃ | 2½ hrs | 176–200 | Do. |
| Do | 4.74% AlCl₃ | 2¾ hrs | 200±5 | Green grease. |
| Do | 5.6% AlCl₃ | 20 min | 200±5 | Golden clear grease. |
| Do | 3.2% FeCl₃·6H₂O | do | 200±5 | White precipitate. |

Although valuable for many purposes, the new esters here disclosed are especially useful for the preparation of derivatives and new chemical compounds. Their novel chemical structure and properties render the esters particularly useful for the preparation of many derivatives. Condensation of the new esters of Δ3,5-cyclohexadiene dicarboxylic acid-1,2 with maleic acid or esters of maleic acid forms new and valuable derivatives. Esters of these acids, as well as esters of other cyclohexadiene dicarboxylic acids also yield new and valuable derivatives on chlorination, hydrolysis of the chlorination products, and on controlled oxidation, etc.

Reference has been made in the specification and the claims to various cyclohexadiene polycarboxylic acids utilized in the preparation of the saturated alcohol esters. In this terminology, "acids" includes either the corresponding anhydride form or the free acid form of the reagent, since either may be utilized. In the product claims, reference to the acid is merely by way of appelation of the final product (unless otherwise indicated), regardless of how made, and is, therefore, not intended to be limiting as to any method employed, since derivatives of the acid having reactive properties similar to the free acid may be utilized.

The melting points of typical cyclohexadiene dicarboxylic acids and their corresponding anhydrides are as follows:

| | Melting Point of — | |
| --- | --- | --- |
| | Acid | Anhydride |
| Trans-Δ3,5-cyclohexadiene dicarboxylic acid-1,2 | 210 | |
| Cis-Δ3,5-cyclohexadiene dicarboxylic acid-1,2 | 173–175 | 99–100 |
| Δ1,4-cyclohexadiene dicarboxylic acid-1,2 | 153 | 134–135 |
| Δ2,4-cyclohexadiene dicarboxylic acid-1,2 | 179–180 | 103 |
| Δ2,6-cyclohexadiene dicarboxylic acid-1,2 | 215 | 81–82 |

The melting points of some of the above acids are not precise due to complications, such as tendency to isomerize or other change in character.

Suitable procedures for preparing the various cyclohexadiene dicarboxylic acids are disclosed in the literature. The trans Δ3,5-cyclohexadiene dicarboxylic acid may be prepared, for example, by sodium mercury amalgam reduction, or by electrolytic reduction of phthalic acid. The trans-Δ3,5-cyclohexadiene dicarboxylic acid-1,2 utilized in the specific examples herein disclosed was prepared by electrolytic reduction of phthalic acid in sulfuric acid solution. Such a method is disclosed in Berichte, volume 39 (1906), pages 2933–2942.

Although this invention has been illustrated with various presently preferred processes and products, numerous alterations utilizing the principles thereof will occur to those skilled in the art, and it is to be understood that the invention is not limited to the specific examples and may be otherwise embodied or practiced within the scope of the appended claims.

I claim:

1. A monomeric diester of a conjugated cyclohexadiene dicarboxylic acid 1,2 having only carboxyl groups as reactive substituents and a saturated monohydric aliphatic alcohol having from 4 to 12 carbon atoms and having only a hydroxyl group as a reactive substituent.

2. A monomeric diester of Δ3,5 cyclohexadiene dicarboxylic acid 1,2 and a saturated monohydric aliphatic alcohol having from 4 to 12 carbon atoms and having only a hydroxyl group as a reactive substituent.

3. A monomeric diester of Δ2,6 cyclohexadiene dicarboxylic acid 1,2 having only carboxyl groups as reactive substituents and a saturated monohydric aliphatic alcohol having from 4 to 12 carbon atoms and having only a hydroxyl group as a reactive substituent.

4. A monomeric diester of octyl alcohol and a conjugated cyclohexadiene dicarboxylic acid 1,2 having only carboxyl groups as reactive substituents.

5. A polymerized diester of a conjugated cyclohexadiene dicarboxylic acid 1,2 having only carboxyl groups as reactive substituents and a saturated monohydric aliphatic alcohol having from 4 to 12 carbon atoms and having only a hydroxyl group as a reactive substituent.

6. A polymerized diester of Δ3,5 cyclohexadiene dicarboxylic acid 1,2 and a saturated monohydric aliphatic alcohol having from 4 to 12 carbon atoms and having only a hydroxyl group as a reactive substituent.

7. A polymerized diester of Δ2,6 cyclohexadiene dicarboxylic acid 1,2 having only carboxyl groups as reactive substituents and a saturated monohydric aliphatic alcohol having from 4 to 12 carbon atoms and having only a hydroxyl group as a reactive substituent.

8. A polymerized diester of octyl alcohol and a conjugated cyclohexadiene dicarboxylic acid, 1,2 having only carboxyl groups as reactive substituents.

9. A monomeric diester of a conjugated cyclohexadiene dicarboxylic acid 1,2 having only carboxyl groups as reactive substituents and a saturated monohydric aliphatic alcohol having from 4 to 20 carbon atoms and having only a hydroxyl group as a reactive substituent.

WILLIAM E. ELWELL.

REFERENCES CITED

The following references are of record in the file of this patent:

UNITED STATES PATENTS

| Number | Name | Date |
|---|---|---|
| 1,921,756 | Kienle | Aug. 8, 1933 |
| 1,951,593 | Bradley | Mar. 20, 1934 |
| 2,062,917 | Lawson | Dec. 1, 1936 |
| 2,301,867 | Gresham | Nov. 10, 1942 |
| 2,311,261 | Staff | Feb. 16, 1943 |
| 2,323,706 | D'Alelio | July 6, 1943 |
| 2,391,226 | Clifford et al. | Dec. 18, 1945 |

OTHER REFERENCES

Beilstein, Hand. der Org. Chem., vol. IX, 4th ed., pp. 783–787.

Allen: "Chem. Abstracts," volume 29 (1935), page 142.